United States Patent
Kogusuri

(10) Patent No.: US 8,781,302 B2
(45) Date of Patent: Jul. 15, 2014

(54) MOVING IMAGE REPRODUCING APPARATUS AND CONTROL METHOD THEREFOR, AND STORAGE MEDIUM

(75) Inventor: Koji Kogusuri, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 201 days.

(21) Appl. No.: 13/091,872

(22) Filed: Apr. 21, 2011

(65) Prior Publication Data

US 2011/0274407 A1    Nov. 10, 2011

(30) Foreign Application Priority Data

May 7, 2010 (JP) ................................ 2010-106881
Jan. 26, 2011 (JP) ................................ 2011-013593

(51) Int. Cl.
*G11B 27/00* (2006.01)
*H04N 5/93* (2006.01)
*H04N 9/80* (2006.01)

(52) U.S. Cl.
USPC ............................ 386/278; 386/239; 386/248

(58) Field of Classification Search
USPC .................. 386/239–248, 278–290, 343–352
See application file for complete search history.

(56) References Cited

U.S. PATENT DOCUMENTS

| | | | | |
|---|---|---|---|---|
| 2005/0105770 | A1* | 5/2005 | Sumitomo et al. | 382/103 |
| 2006/0058625 | A1* | 3/2006 | Mori | 600/407 |
| 2007/0077025 | A1* | 4/2007 | Mino | 386/95 |
| 2008/0131073 | A1* | 6/2008 | Ogawa et al. | 386/52 |
| 2008/0159708 | A1* | 7/2008 | Kazama et al. | 386/69 |
| 2008/0262354 | A1* | 10/2008 | Yoshida et al. | 600/443 |
| 2009/0022403 | A1* | 1/2009 | Takamori et al. | 382/195 |
| 2009/0080790 | A1* | 3/2009 | Hasegawa | 382/260 |

FOREIGN PATENT DOCUMENTS

| | | |
|---|---|---|
| JP | 06-217187 | 8/1994 |
| JP | 2008-236645 | 10/2008 |

* cited by examiner

*Primary Examiner* — Hung Dang
(74) *Attorney, Agent, or Firm* — Cowan, Liebowitz & Latman, P.C.

(57) ABSTRACT

A moving image reproducing apparatus which performs blur correction focusing on a portion highly likely to be paid attention by a user, in reproduction operation without user's specific operation. The moving image reproducing apparatus is connected to a recording medium that records moving image data. A moving image data recorded in the recording medium is searched, based on a designated search condition, a motion vector calculating position for blur correction is set to the searched moving image data based on the search condition, a motion vector of the searched moving image data is calculated based on the motion vector calculating position, a blur correction cut-out region of the searched moving image data is set based on the calculated motion vector and the searched moving image data is subjected to blur correction, and a moving image data subjected to the blur correction is output.

9 Claims, 8 Drawing Sheets

A

A-1
BLUR CORRECTION PROCESSING BASED ON FACE DETECTION POSITION

A-2
BLUR CORRECTION PROCESSING BASED ON IMAGE CENTER COORDINATES

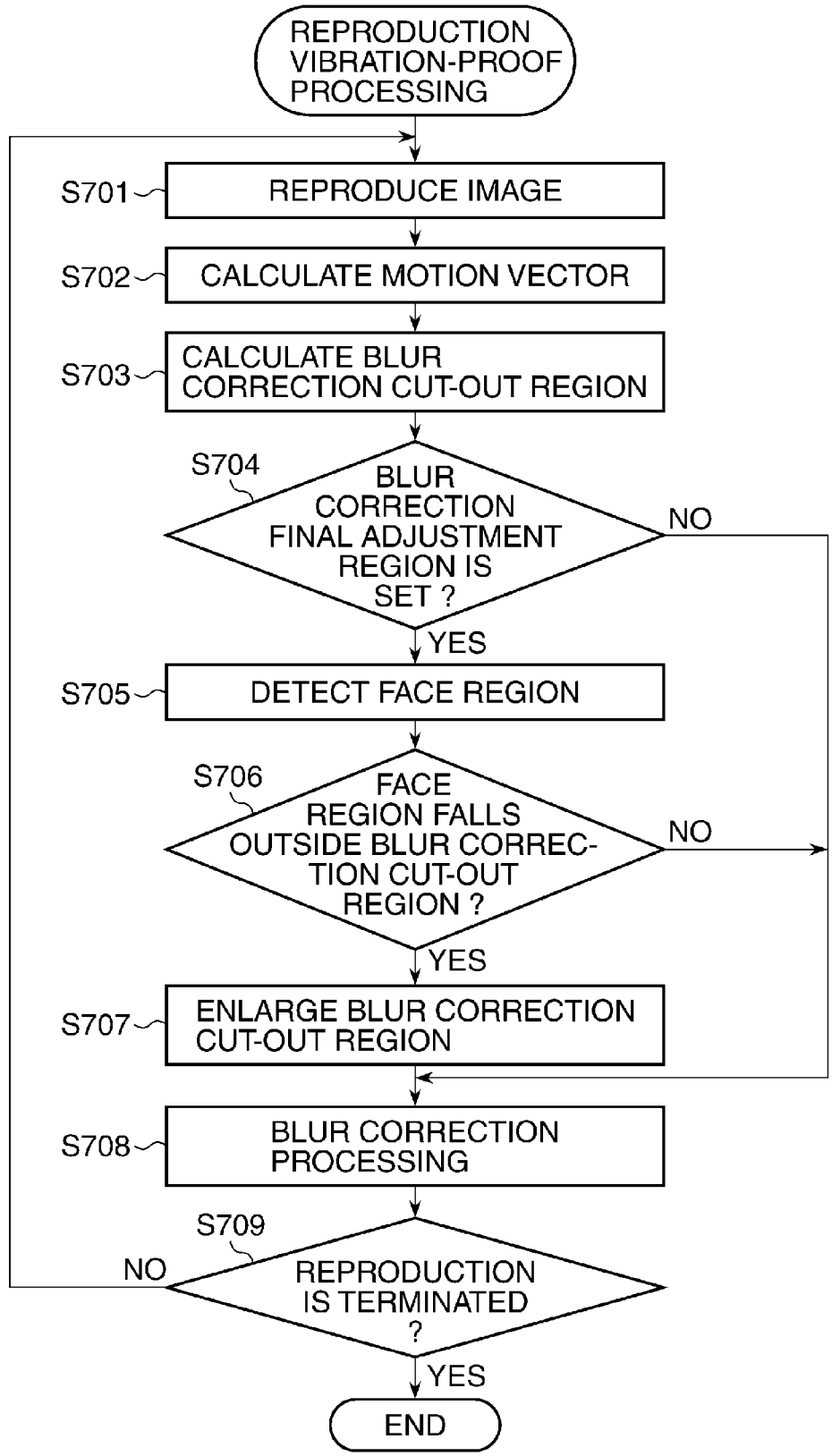

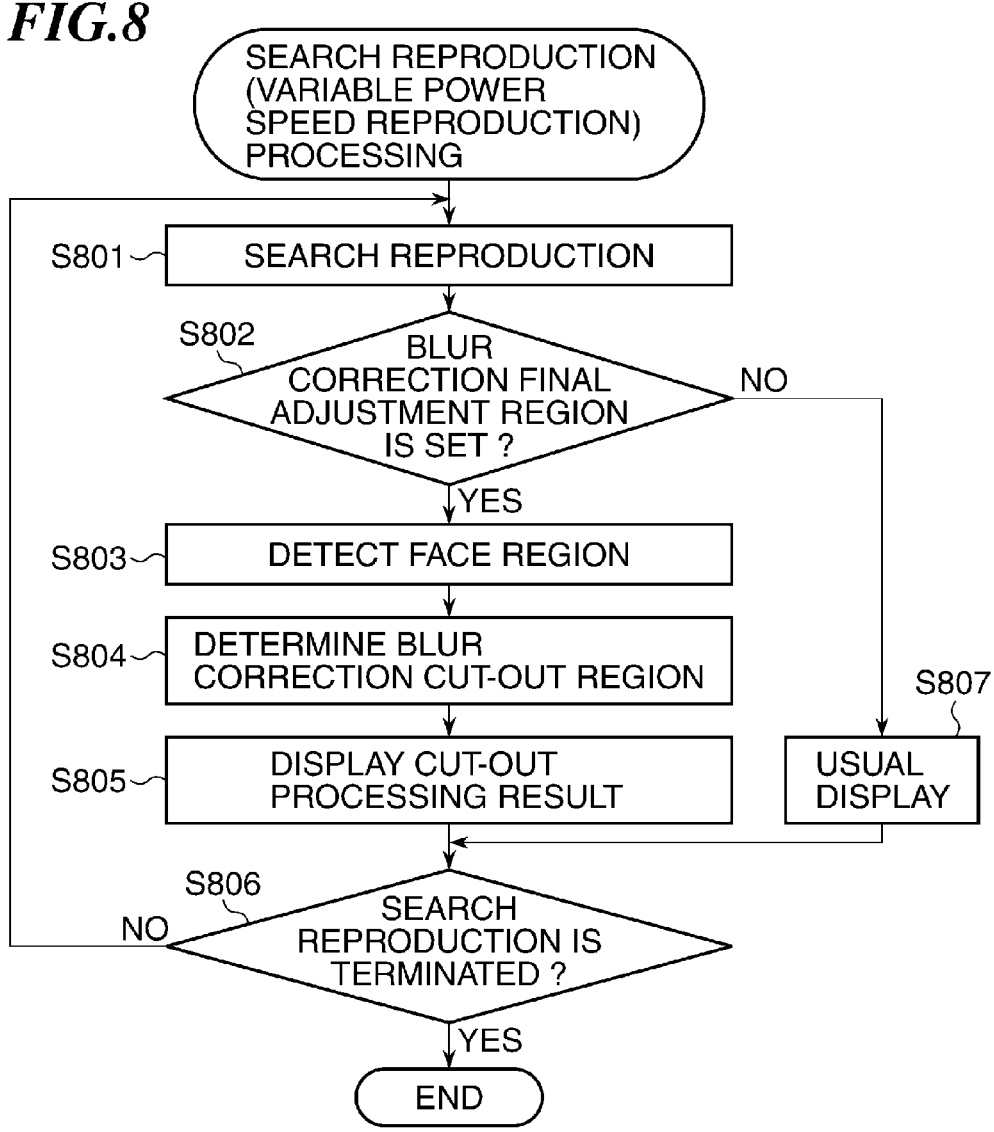

MOVING IMAGE REPRODUCING APPARATUS AND CONTROL METHOD THEREFOR, AND STORAGE MEDIUM

BACKGROUND OF THE INVENTION

1. Field of the Invention

The present invention relates to a moving image reproducing apparatus and a control method therefor, and a storage medium.

2. Description of the Related Art

A moving image reproducing apparatus usually has a blur correction device which performs blur correction of a moving image, and specifically the blur correction of a detected position of a face detected in the moving image (for example, Japanese Laid-Open Patent Publication (Kokai) No. 2008-236645).

Japanese Laid-Open Patent Publication (Kokai) No. H06-217187 discloses an image shake correction device which performs shake correction of a portion of a detection region of a subject designated by a user in consideration of an image composition and a position of the subject.

In the prior art, the blur correction is applied to a face detection result and a focus position during recording operation, which requires, when the blur correction is performed during the image reproduction, a user to select a motion vector calculating position for correction by operation keys, a touch panel. Selection of coordinates in an image during reproduction by the operation keys requires, many operations for positional alignment, which makes operation complicated. Meanwhile, use of the touch panel makes the positional alignment relatively facilitated, but increases the cost of mounting the touch panel leads.

There are various positions to which a user wants to apply blur correction according to the conditions during the image reproduction, thereby making it difficult to automatically specify the blur correction position by only information added to moving image data.

SUMMARY OF THE INVENTION

The present invention provides a moving image reproducing apparatus and a control method therefor, and a storage medium which performs blur correction focusing on a portion highly likely to be paid attention by a user, in reproduction operation without user's specific operation.

According to a first aspect of the present invention, there is provided with a moving image reproducing apparatus connected to a recording medium that records moving image data, comprising: a designation unit configured to designate a search condition of the moving image data; a search unit configured to search the moving image data recorded in the recording medium, based on the search condition designated by the designation unit; a motion vector calculating position-setting unit configured to set a motion vector calculating position for blur correction to the moving image data searched by the search unit, based on the search condition; a motion vector calculation unit configured to calculate a motion vector of the moving image data searched by the search unit, based on the motion vector calculating position; a blur correction unit configured to set a blur correction cut-out region of the moving image data searched by the search unit, based on the motion vector calculated by the motion vector calculating unit, and subjecting the searched moving image data to blur correction; and an output unit configured to output a moving image data subjected to the blur correction by the blur correction setting unit.

According to a second aspect of the present invention, there is provided with a moving image reproducing apparatus connected to a recording medium that records moving image data, comprising: a designation unit configured to designate a search condition of the moving image data; a search unit configured to search the moving image data recorded in the recording medium, based on the search condition designated by the designation unit; a motion vector calculation unit configured to calculate a motion vector of the moving image data, searched by the search unit, based on the search condition; a blur correction cut-out region calculation unit configured to calculate a blur correction cut-out region of the moving image data searched by the search unit, based on the motion vector calculated by the motion vector calculation unit; an attention position setting unit configured to set an attention position of the moving image data searched by the search unit, based on the search condition; a blur correction cut-out region adjustment unit configured to adjust a blur correction cut-out region such that the attention position set by the attention position setting unit falls within the blur correction cut-out region calculated by the blur correction cut-out region calculation unit; and an output unit configured to cut out the blur correction cut-out region adjusted by the blur correction cut-out region adjustment unit and output the cut-out result.

According to a third aspect of the present invention, there is provided with a moving image reproducing apparatus connected to a recording medium that records moving image data, comprising: a designation unit configured to designate a search condition of the moving image data; a search unit configured to search the moving image data recorded in the recording medium, based on the search condition designated by the designation unit; an attention position setting unit configured to set an attention position of the moving image data searched by the search unit, based on the search condition; and a reproduction unit configured to enlarge and reproduce a part of the set attention position in each frame of specific moving image data in the search result by the search unit.

With this arrangement, it is possible to performs blur correction focusing on a portion highly likely to be paid attention by a user, in reproduction operation without user's specific operation.

Further features of the present invention will become apparent from the following description of exemplary embodiments with reference to the attached drawings.

BRIEF DESCRIPTION OF THE DRAWINGS

FIGS. 5A to 5C are views, each of which is useful in explaining a multi-index screen displayed by a display output unit 104, in which FIG. 5A illustrates a case where moving image data recorded in a recording medium 200 in FIG. 1 is displayed, FIG. 5B illustrates a case where the moving image data searched by a search condition according to photographing date and time is displayed, and FIG. 5C illustrates a case where the moving image data searched by the search condition according to face search is displayed;

FIG. 7 is a flowchart showing the procedure of a reproduction vibration-proof processing executed when the motion vector calculating position is set to the face detection position in step S604 of FIG. 6.

FIG. 8 is a flowchart showing the procedure of a search reproduction (variable power speed reproduction) processing executed by the image reproducing apparatus according to the second embodiment of the present invention.

FIG. 9 is a view showing an example in which an image cut out in step S805 of FIG. 8 is enlarged, and the entire reproduced image obtained in step S801 of FIG. 8 is reduced so as to be superimposed on the cut-out enlarged image.

DESCRIPTION OF THE EMBODIMENT

The present invention will now be described in detail with reference to the drawings.

Figure 1:
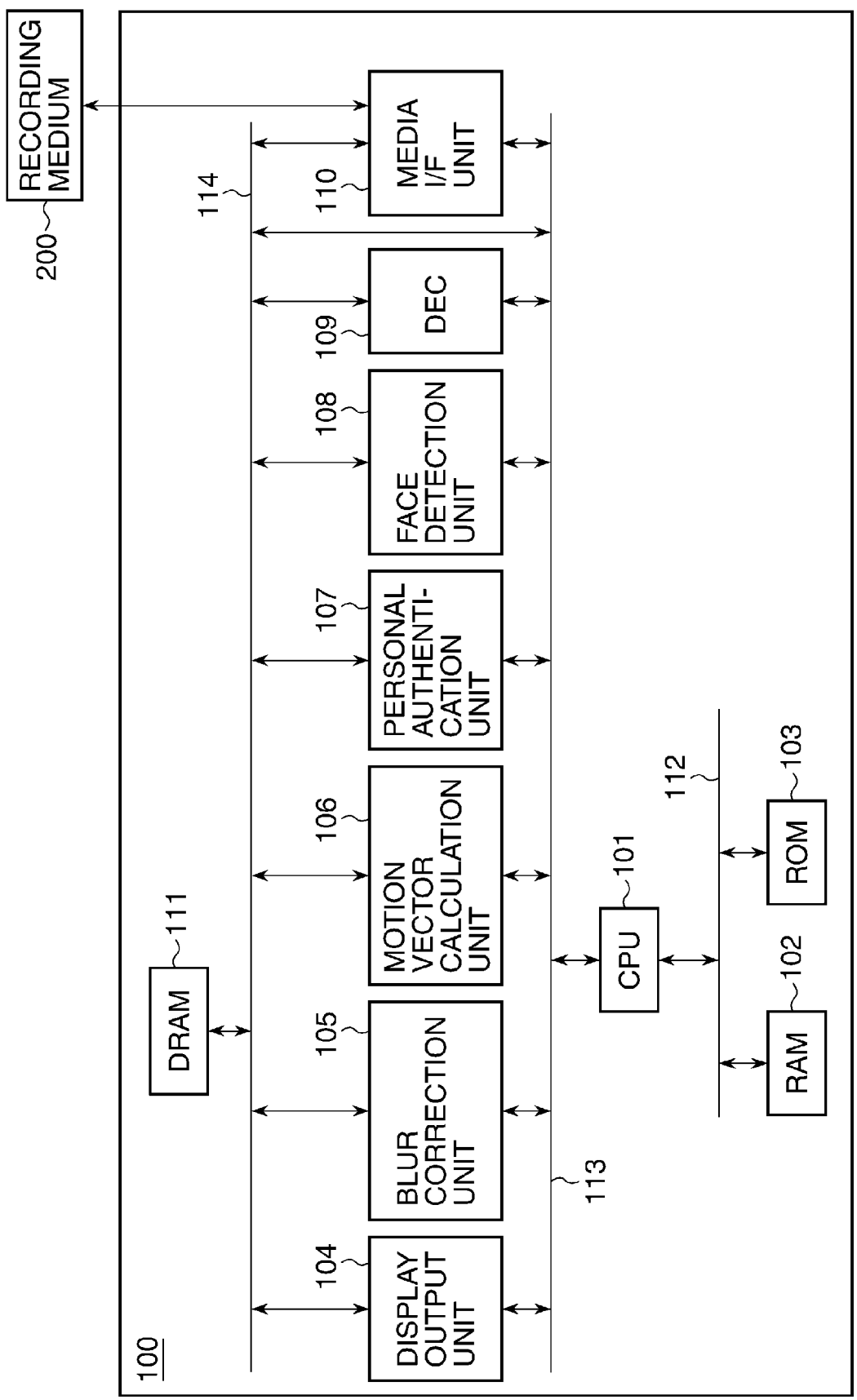
FIG. 1 is a block diagram schematically showing a configuration of a moving image reproducing apparatus according to a first embodiment of the present invention.

FIG. 1 is a block diagram schematically showing a configuration of a moving image reproducing apparatus according to a first embodiment of the present invention.

In FIG. 1, an image reproducing apparatus 100 comprises a CPU 101, a RAM 102, and a ROM 103 connected with one another through a program bus 112.

The image reproducing apparatus 100 further comprises a display output unit 104, a blur correction unit 105, a motion vector calculation unit 106, a personal authentication unit 107, a face detection unit 108, a decoder (DEC) 109, and a media I/F unit 110, which components are connected to a CPU 101 through a control bus 113 to be controlled by the CPU 101, and are connected to a DRAM (Dynamic Random Access Memory) 111 through a data bus 114. The data bus 114 is used for transferring image data and coded data.

The control bus 113 and the data bus 114 are connected to each other. The media I/F unit 110 is an interface between the image reproducing apparatus 100 and a recording medium 200 such as a memory card attachable to and removable from the image reproducing apparatus 100. To the media I/F unit 110 is connected the recording medium 200.

The CPU 101 controls the overall operation of the image reproducing apparatus 100. The RAM 102 is a work memory of the CPU 101. The ROM 103 stores programs and data executed by the CPU 101. The DRAM 111 temporarily stores image data and coded data processed in each unit of the image reproducing apparatus 100.

The display output unit 104 includes a display including a liquid crystal panel, which displays and outputs an image reproduced in the image reproducing apparatus 100, and an external output terminal.

The motion vector calculation unit 106 reads the image data stored in the DRAM 111 and calculates motion vector data of the image thus read. The blur correction unit 105 corrects a blur of an image using the motion vector data calculated by the motion vector calculation unit 106. The personal authentication unit 107 determines whether or not a person in an image is a specific person, using a face position detected by the face detection unit 108. The face detection unit 108 detects the face position of a person based on the image data read from the DRAM 111. The DEC 109 reads the coded data from the DRAM 111 to decode the coded data and thus to generate a reproduced image.

The image reproducing apparatus 100, when usually reproducing the moving image reproduction, reads the coded data into the DRAM 111 through the media I/F unit 110, and generates the reproduced image by the DEC 109 to be output from the display output unit 104.

Figure 2:
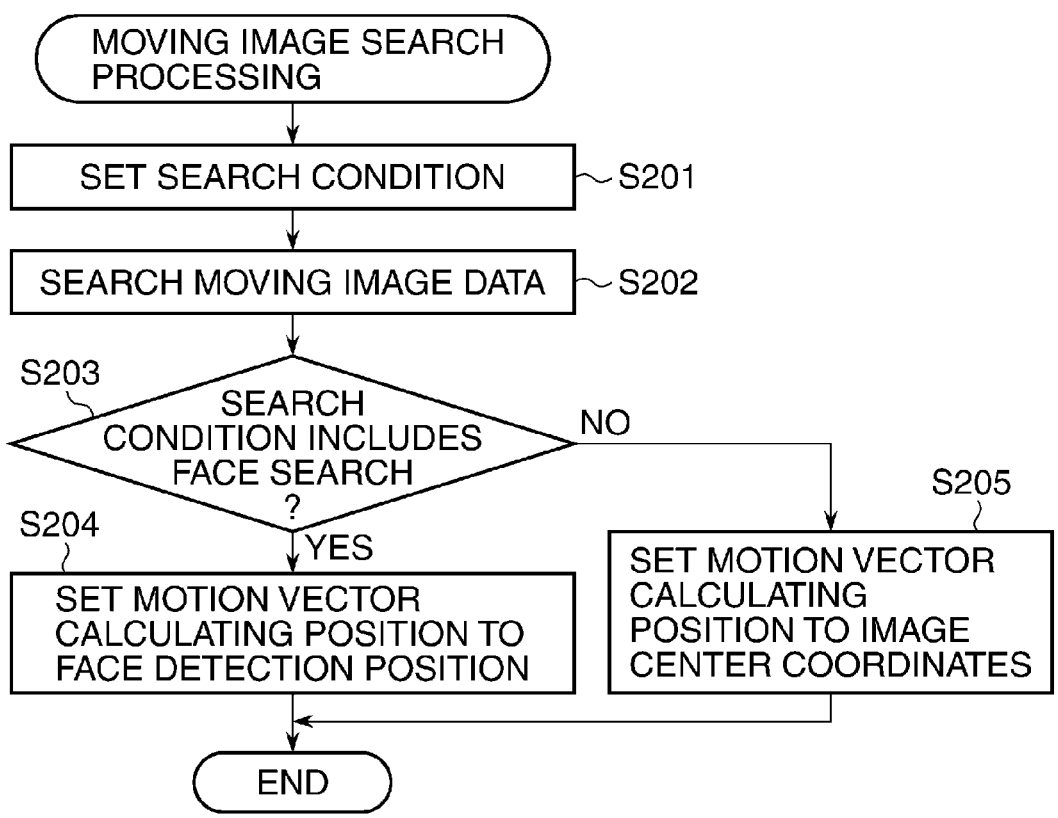
FIG. 2 is a flowchart showing the procedure of a moving image search processing executed by the moving image reproducing apparatus of FIG. 1.

FIG. 2 is a flowchart showing the procedure of a moving image search processing executed by the moving image reproducing apparatus of FIG. 1.

The moving image search processing aims to perform reproduction vibration-proofing so as to correct a blur of a subject according to the search condition used when searching the moving image data to be reproduced, with reproduction of a moving image.

The processing of FIG. 2 is executed by the CPU 101 developing the program recorded in the ROM 103 into the RAM 102.

In FIG. 2, first, a user sets the search condition for searching desired moving image data from the moving image data recorded in the recording medium 200 (step S201). For example, a menu has items, including face search and date search, which are selected by a user. The CPU 101 functions as a standby unit waiting for the selection by the user and realizes the standby function on a program.

Then, the CPU 101 searches the moving image data (FIG. 5A) recorded in the recording medium 200 based on the search condition set in the step S201 (step S202). For example, when the date search is selected, the moving image data matching the search condition set in the step S201 is extracted from photographing date and time recorded in management information of the moving image data and photographing date and time included in additional information multiplexed in the moving image data (FIG. 5B). When the face search is selected, the moving image data including the relevant face is extracted using face information that can be included in the management information of the moving image data and face information detected by the face detection unit 108 with only a head image decoded (FIG. 5C).

In the subsequent step S203, the CPU 101 determines whether or not the search condition set in the step S201 includes the face search or a search associated with a face.

As a result of the determination in step S203, when the search condition includes the face search or the search associated with a face, a motion vector calculating position is set to the face detection position (step S204). whereas when the search condition does not include the face search or the search associated with a face, the motion vector calculating position is set to the image center coordinates (step S205), followed by the processing terminating.

In FIG. 2, when the search condition does not include the face search or the search associated with a face, the motion vector calculating position is set to the image center coordinates (step S205), but may be set to "no motion vector calculating position" in which the reproduction vibration-proofing is not performed. Namely, although FIG. 2 shows the processing in the case of searching the moving image data, the motion vector calculating position may be set, when the moving image data is not searched, to the image center coordinates or to "no motion vector calculating position" in which the reproduction vibration-proofing is not performed.

When a specific person can be authenticated in the face detection, the motion vector calculating position may be set to the position detected by the face detection unit 108.

Figure 5A:
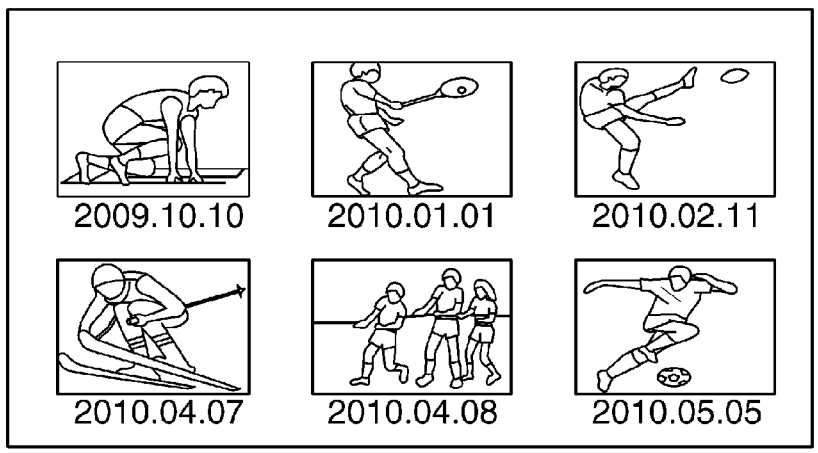
Figure 5B:
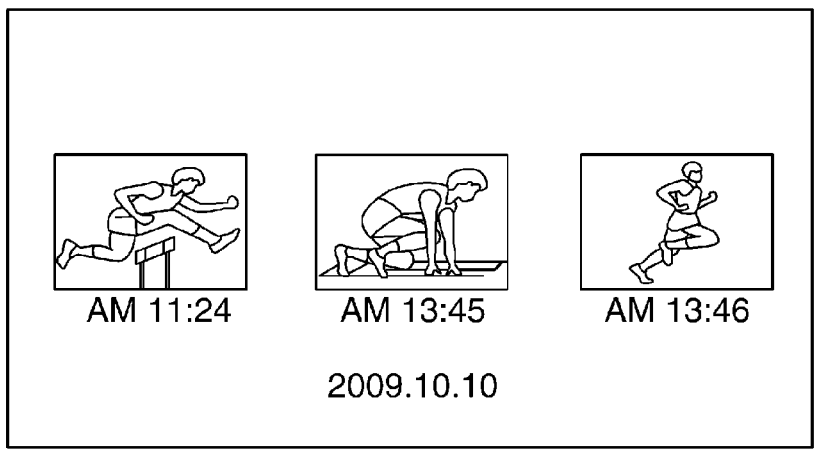
Figure 5C:
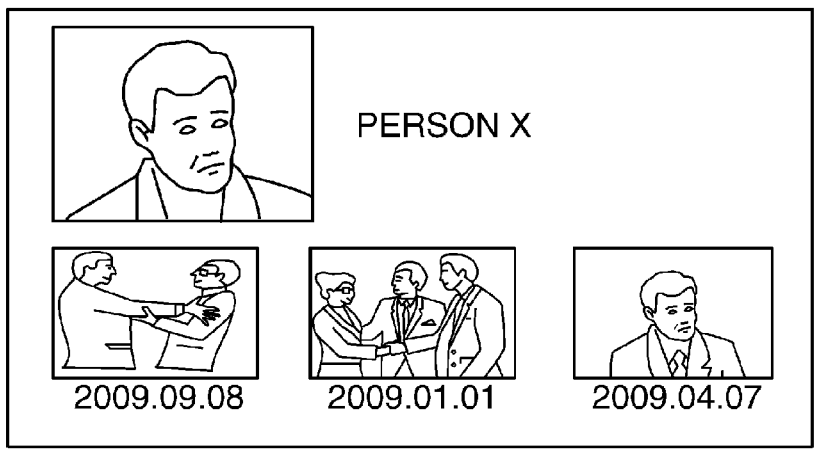

FIGS. 5A to 5C are views, each of which is useful in explaining a multi-index screen displayed by the display output unit 104, in which FIG. 5A illustrates a case where the moving image data recorded in the recording medium 200 in FIG. 1 is displayed, FIG. 5B illustrates a case where the moving image data searched by the search condition according to the photographing date and time is displayed, and FIG. 5C illustrates a case where the moving image data searched by the search condition according to the face search is displayed.

FIG. 5A illustrates the usual multi-index screen before the moving image data is searched. In the multi-index screen, respective representative images of a plurality of moving image files recorded in the recording medium 200 are displayed in rows in the time-oriented order of the corresponding moving images being photographed.

FIG. 5B illustrates a display example of the multi-index screen of the moving image data with the search condition as the photographing date of Oct. 10, 2009. Specifically, when the search condition includes not the face search but the date search in the determination of step S203 of FIG. 2, only the representative images of the moving images photographed on the designated date (in this example, Oct. 10, 2009) are displayed among the moving images recorded in the recording medium 200.

FIG. 5C illustrates a display example of the multi-index screen of the moving image data with the search condition as the face search including a face of a person X. Specifically, when the search condition includes the face search including the face of the person X in the determination in step S203 of FIG. 2, only the representative images of the moving images with the designated person X being recognized to be included therein are displayed among the moving images recorded in the recording medium 200.

Figure 3:
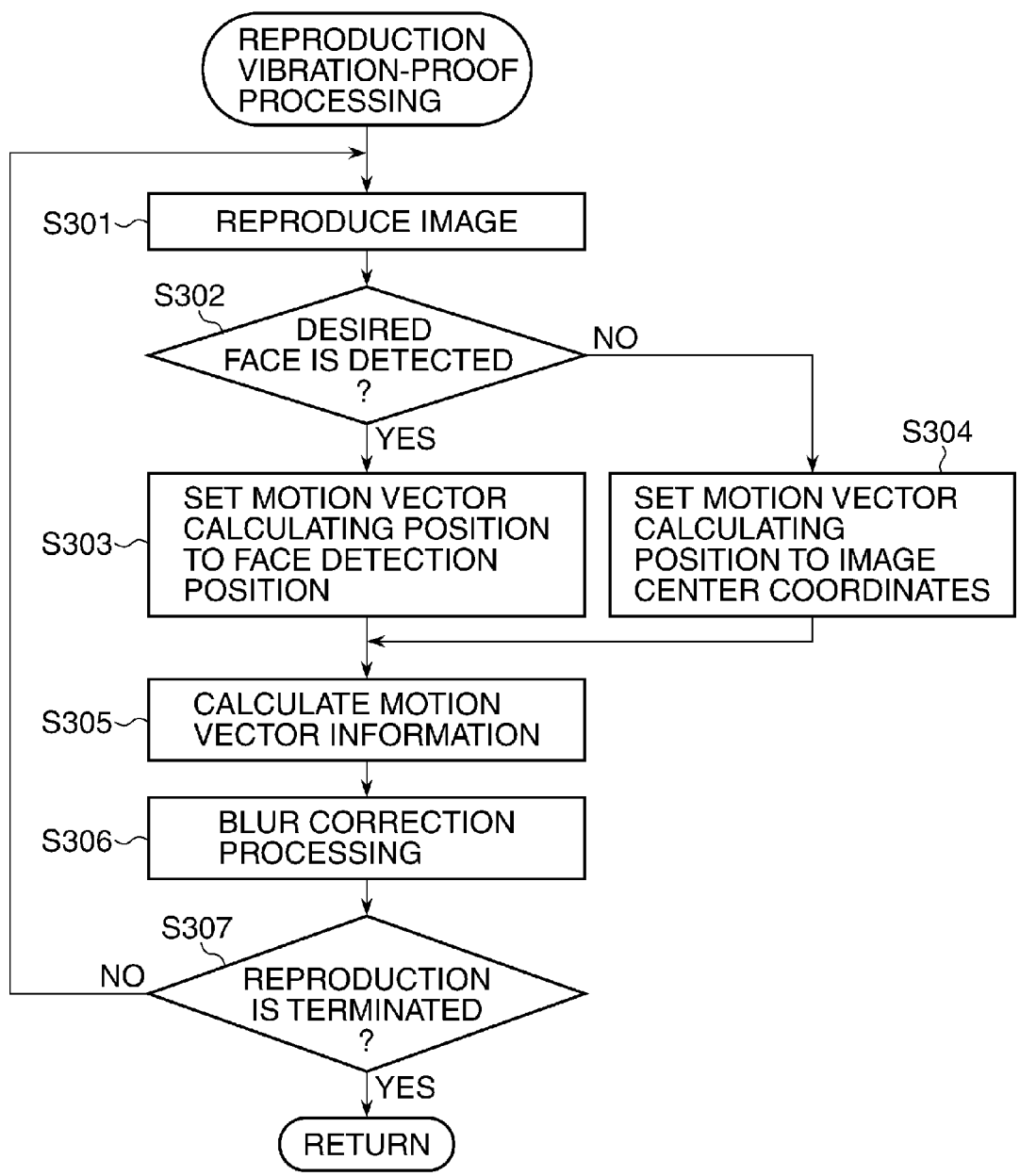
FIG. 3 is a flowchart showing the procedure of a reproduction vibration-proof processing executed when a motion vector calculating position is set to a face detection position in step S204 of FIG. 2.

FIG. 3 is a flowchart showing the procedure of a reproduction vibration-proof processing executed when the motion vector calculating position is set to the face detection position in step S204 of FIG. 2.

The processing of FIG. 3 is executed by the CPU 101 developing the program recorded in the ROM 103 into the RAM 102.

The processing of FIG. 3 is performed on the assumption that the moving image data search is performed before the reproduction of the moving image data, and that the motion vector calculating position is set to the face detection position in the step S204 of FIG. 2. When the reproduction of the moving image data of the selected desired representative image (hereinafter referred to as "the selected moving image data") is instructed by user operation based on a search result screen illustrated in FIG. 5C, the processing of FIG. 3 is started.

In FIG. 3, when the reproduction is instructed by the user operation, the decoder 109 performs decoding processing of the selected moving image to reproduce the image (step S301).

Then, the face detection unit 108 detects whether or not the reproduced image obtained in step S301 includes a desired face (step S302). When the reproduced image includes the desired face, the face detection position detected in step S302 is notified to the motion vector calculation unit 106 to set the motion vector calculating position to the face detection position (step S303), followed by the processing proceeding to step S305. On this occasion, when the image data search in step S202 of FIG. 2 aims to search the moving image including a face without specifying a person, the desired face at that time includes a face occupying a large area in an image among a plurality of faces detected simultaneously and a face automatically determined as a main face by conditions including that a face is close to the center of an image. Meanwhile, when the image data search in step S202 of FIG. 2 includes a face of a specific person (for example, FIG. 5C), the face detection position to be notified is a position of the face of the specific person (for example, the face of the person X of FIG. 5C) as the search condition.

As a result of the determination in step S302, when the reproduced image does not include the desired face, center position information of the image is notified to the motion vector calculation unit 106 to set the motion vector calculating position to the image center coordinates (step S304), followed by the processing proceeding to step S305.

In the subsequent step S305, the motion vector calculation unit 106 calculates motion vector information from the reproduced image, obtained in the step S301, based on the motion vector calculating position set in the step S303 or S304. The function of the motion vector calculation unit 106 may be realized by the CPU 101. In this case, the CPU 101 realizes the motion vector calculation function.

Then, the blur correction unit 105 applies blur correction processing to the reproduced image, obtained in the step S301, based on the motion vector information obtained in the step S305. The image data subjected to the blur correction processing is displayed in the display output unit 104 (step S306). The function of the blur correction unit 105 may be realized by the CPU 101. In this case, the CPU 101 realizes the blur correction function.

Finally, when a user instructs to terminate the reproduction, or when all image reproduction is terminated (YES to step S307), the processing is terminated.

According to the first embodiment of the invention, when the motion vector calculating position is set to the face detection position in the step S303 of FIG. 3, the moving image (for example, the moving image selected on the screen of FIG. 5C), is subjected to the reproduction vibration-proofing with the motion vector calculating position set to the face detection position (A-1 of FIG. 4), which most reduces the blur of the person of which face is detected. Meanwhile, when the motion vector calculating position is set not to the face detection position but to the image center coordinates in the step S304 of FIG. 3, the moving image reproduction (for example, the moving images selected on the screens of FIGS. 5A and 5B) is subjected to the reproduction vibration-proofing with the motion vector calculating position set to the image center coordinates without performing the face detection (A-2 of FIG. 4), which most reduces the blur of the entire image.

In the first embodiment, as a result of the determination in step S302, when the reproduced image does not include the desired face, the motion vector calculating position is set to the image center coordinates, but may be set to "no motion vector calculating position" in which the reproduction vibration-proofing is not performed.

In the first embodiment, when the blur correction unit 105 performs the blur correction processing (step S306), the fact that the blur correction processing is being performed may be notified to a user, using an LED lamp (not shown) or an OSD (On Screen Display) function.

Figure 4:
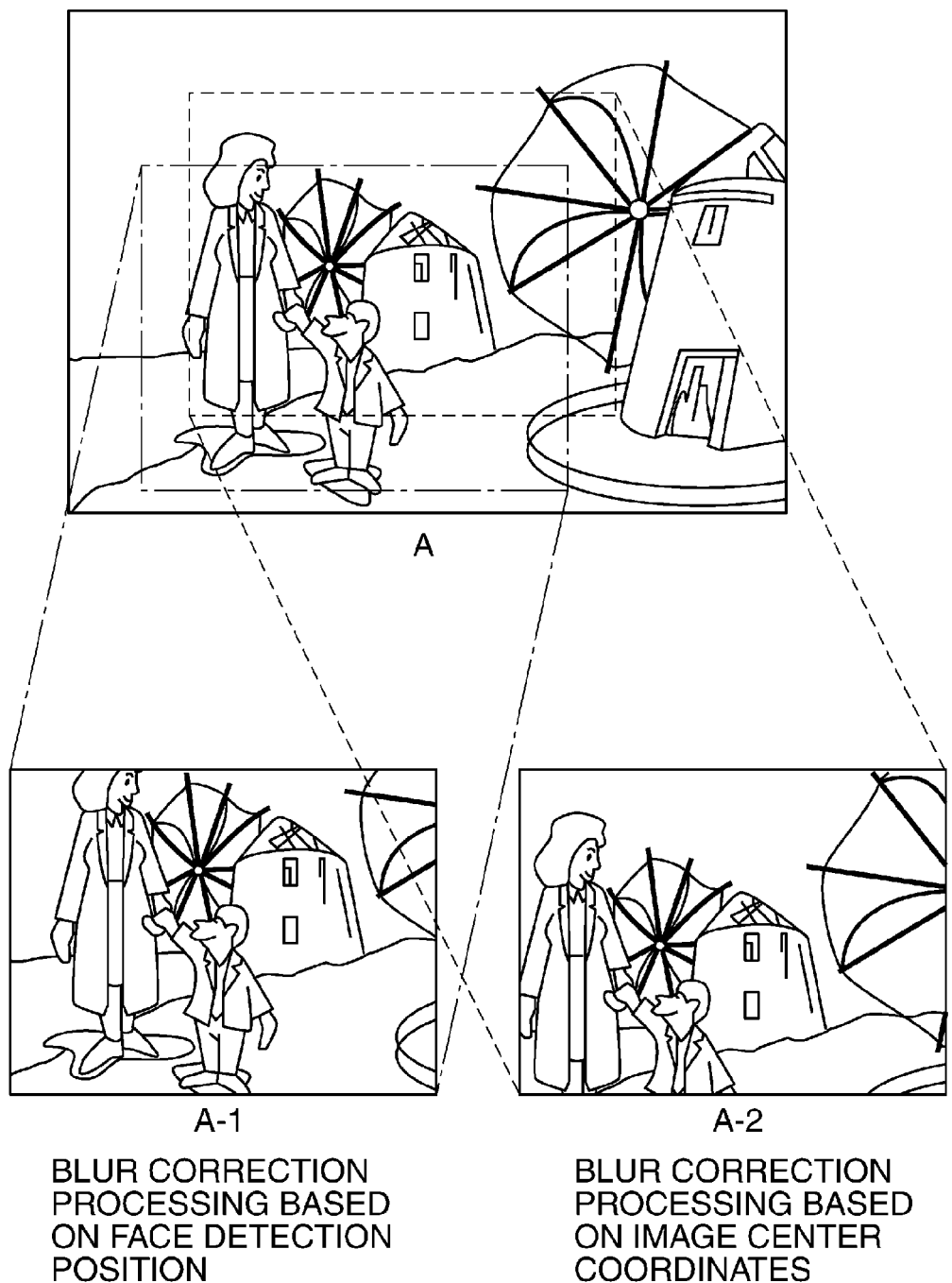
FIG. 4 is a view which is useful in explaining a blur correction processing executed when the motion vector calculating position is set to the face detection position in step S204 of FIG. 2 and in step S303 of FIG. 3, and a blur correction processing executed when the motion vector calculating position is set to image center coordinates in step S205 of FIG. 2 and in step S304 of FIG. 3.

FIG. 4 is a view which is useful in explaining a blur correction processing executed when the motion vector calculating position is set to the face detection position in step S204 of FIG. 2 and in step S303 of FIG. 3, and a blur correction processing executed when the motion vector calculating position is set to image center coordinates in step S205 of FIG. 2 and in step S304 of FIG. 3.

In FIG. 4, an image A shows a reproduced image during usual reproduction. The image A is directed to an image in which the entire range of the reproduced image generated by decoding moving image-coded data recorded in the recording medium 200 by the decoder 109 is displayed as it is on the display output unit 104. When the blur correction is performed, each of the frames is not to display the entire range of a single frame image, but to display a cut-out part of the single frame image. At that time, a part of the single frame image is cut out to be displayed while the cut-out position is changed between frames so as to eliminate the motion vector to be collected, whereby the blur is corrected.

The image A-1 of FIG. 4 is directed to a reproduced image obtained when the motion vector calculating position is set to the face detection position in the step S204 and the step S303 of FIG. 3, with the blur correction processing applied to the face position of a person.

In the first embodiment, when the motion vector calculating position is set to the face detection position, the blur correction is performed so that the motion vector of a face is 0 (zero)(or are eliminated to be reduced), which reduces the blur of a person's face in an image, but may not reduce the blur of the entire image. This enables an image to be displayed with a background (the entire image) blurred, but without only a face blurred, which enables a user to see the face matched by a search key with less blur, in other words, enables a user to see a portion, to which the user pays attention at the time of searching, with high visibility. Consequently, according to the processing, it is possible to reduce a subject blur in a person's face.

In FIG. 4, the image A-2 is directed to a reproduced image obtained when the motion vector calculating position is set to the image center coordinates in the step S205 of FIG. 2 and the step S304 of FIG. 3, with the blur correction processing applied to the image center coordinates. The same holds for a case where the face of the person with a blur to be removed is not detected in the step S302 of FIG. 3, and the motion vector calculating position is set to the image center coordinates in the step S304 of FIG. 3.

In the first embodiment, when the motion vector calculating position is set to the image center coordinates, the blur correction is performed such that the largest number of the motion vectors in the entire image becomes 0 (zero) (or are eliminated to be reduced), which reduces the blur of the entire image, but may not reduce the blur of a person's face in an image. This enables an image to be displayed without the entire image blurred, but with the face blurred due to the subject blur. Consequently, according to the processing, it is possible to mitigate a hand blur at the time of photographing.

As described above, according to the first embodiment, when the moving image search condition includes the face condition, it is possible to obtain a reproduced moving image in which the blur correction processing is applied to the face position in the reproduced moving image.

When a scene being reproduced is, during the reproduction of a moving image, changed to a scene which does not satisfy the search condition (a reproduction position), the moving image reproduction may be terminated. For example, when the search condition includes the face condition, the moving image reproduction may be terminated when a reproduced image is changed to a scene which does not include any face.

When the motion vector calculating position based on the search condition cannot be set, the moving image reproduction may be terminated.

When the search condition is not designated, the motion vector calculating position may be set to the image center coordinates.

When an object is searched with the existence of a specific object as the search condition, the motion vector calculating position may be set to the detected position of the object. The CPU 101 functions as an object detection unit to realize an object detection function by a program.

In the first embodiment, the motion vector calculating position is set to the face detection position in step the S204 of FIG. 2, and the motion vector calculating position is set to the image center coordinates in the step S205 of FIG. 2; however, the motion vector calculating position may not necessarily be set, and instead, the determination result in the step S203 of FIG. 2, the used search condition, or the current display mode capable of specifying the used search condition has only to be recorded in the RAM 102. When it can be determined that the instruction of the reproduction of a moving image indicates to reproduce a moving image found by the face search or the search associated with a face based on the information recorded in the RAM 102, blur correction reproduction is performed according to the processing of FIG. 3, which enables the subject blur of a face used in the search condition to be corrected. Meanwhile, when it can be determined that the instruction of the reproduction of a moving image indicates to reproduce a moving image which is not the moving image found by the face search or the search associated with a face based on the information recorded in the RAM 102, a moving image is reproduced by performing the blur correction reproduction (so-called hand blur correction) for correcting the blur of the entire image or by not performing the blur correction.

A description will now be described of an image reproducing apparatus according to a second embodiment of the present invention.

The image reproducing apparatus according to the second embodiment has the same constitution as the image reproducing apparatus of the first embodiment.

Figure 6:
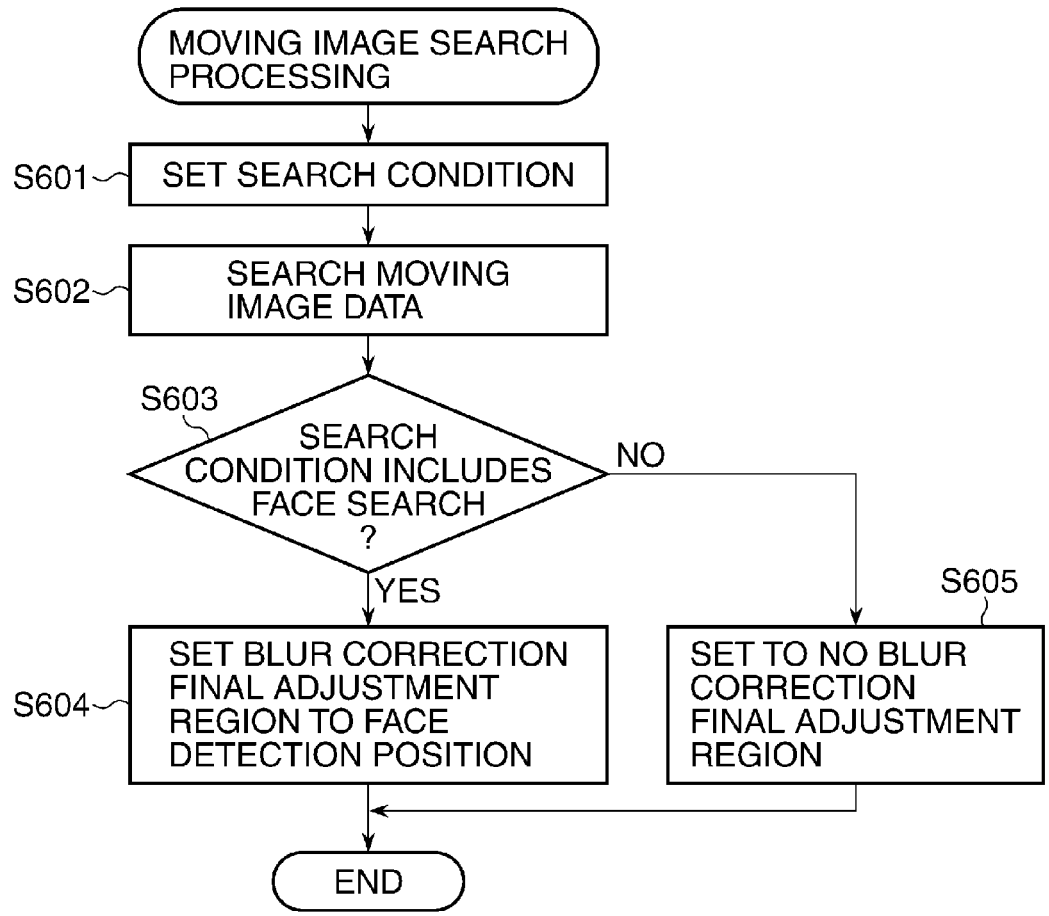
FIG. 6 is a flowchart showing the procedure of a moving image search processing executed by an image reproducing apparatus according to a second embodiment of the present invention.

FIG. 6 is a flowchart illustrating a procedure of a moving image search processing executed by an image reproducing apparatus according to the second embodiment of the present invention.

In this processing, when a moving image to be reproduced is searched, a subject which is the search condition is prevented from projecting from a display range due to the blur correction by cutting-out.

The CPU 101 develops a program recorded in the ROM 103 in the RAM 102, whereby the processing of FIG. 6 is executed. In steps S601 to 603 of FIG. 6, the processing is executed in the same way as steps S201 to S203 of FIG. 2.

In FIG. 6, when the search condition set in step S601 includes the face search or the search associated with a face (YES to step S603), a blur correction final adjustment region is set to the face detection position (step S604) (FIG. 5C), followed by the processing terminating.

When the search condition set in the step S601 does not include the face search or the search associated with a face (NO to the step S603), setting to no blur correction final adjustment region is performed (step S605) (FIG. 5B), followed by the processing terminating. The CPU 101 functions as a search unit and a blur correction final adjustment region setting unit and realizes the search function and the blur correction final adjustment region setting function.

When a specific person can be authenticated at the time of the face detection, the blur correction final adjustment region may be set to a position detected by the face detection unit 108.

FIG. 7 is a flowchart showing the procedure of a reproduction vibration-proof processing executed when the motion vector calculating position is set to the face detection position in step S604 of FIG. 6.

The processing of FIG. 7 is executed by the CPU 101 developing a program recorded in the ROM 103 into the RAM 102.

The processing of FIG. 7 is performed on the assumption that the moving image data is searched before the reproduction of the moving image data, and the motion vector calculating position is set to the face detection position in the step S604 of FIG. 6. When the reproduction of the moving image data of the selected desired representative image (hereinafter referred to as "the selected moving image data" is instructed by the user operation based on a search result screen illustrated in FIG. 5C, the processing of FIG. 7 is started.

In FIG. 7, when the reproduction is instructed by the user operation, the decoder 109 performs decoding processing of the selected moving image to reproduce the image (step S701).

Then, the motion vector calculation unit 106 calculates the motion vector information (equivalent to the motion vector based on the image center coordinates) of the entire reproduced image obtained in the step S701 (step S702). The function of the motion vector calculation unit 106 may be realized by the CPU 101. In this case, the CPU 101 realizes the motion vector calculation function.

The blur correction unit 105 calculates a blur correction cut-out region based on the motion vector information obtained in the step S702 so as to reduce the blur level of the entire reproduced image obtained in the step S701 (step S703). The function of the blur correction unit 105 may be realized by the CPU 101. In this case, the CPU 101 realizes the blur correction cut-out region calculation function.

Then, it is discriminated whether or not the blur correction final adjustment region is set (step S704). When the blur correction final adjustment region is set, the face detection unit 108 detects a face region in the reproduced image obtained in step S301 (step S705). The detected face region is an example of an attention position based on the search condition. The CPU 101 functions as an attention position setting unit which sets the attention position to a searched moving image and realizes the attention position function on a control program.

Further, it is determined whether or not the face region detected in the step S705 falls outside the blur correction cut-out region calculated in the step S703 (step S706). When the detected face region falls outside the blur correction cut-out region, the blur correction cut-out region is enlarged so that the face region detected in the step S705 falls within the blur correction cut-out region calculated in the step S703 (step S707). The CPU 101 functions as the blur correction cut-out region adjustment unit which adjusts the blur correction cut-out region and realizes the blur correction cut-put region adjustment function on the control program.

As a result of the determination in step S704, when the blur correction final adjustment region is not set, or as a result of the determination in step S706, when the face region does not fall outside the blur correction cut-out region, the processing proceeds to step S708.

In the subsequent step S708, the blur correction unit 105 performs the blur correction processing in the blur correction cut-out region calculated in the step S703 or in the blur correction cut-out region enlarged in the step S707 to thereby allow the display output unit 104 to display an image subjected to the blur correction processing.

Finally, the electronic blur correction is performed when a user instructs to terminate the reproduction, or when all image reproduction is terminated (YES to step S709), the processing is terminated.

In the second embodiment, the electronic blur correction is performed by cutting out not the whole but a part of each frame image of a moving image, whereby a subject set as the search condition when searching a moving image being reproduced can be prevented from projecting from the display range due to cutting-out for the blur correction. Namely, it is possible to prevent or suppress that the blur correction reduces the visibility to the subject set as the search condition when searching the moving image being reproduced, that is, the subject to which a user may pay attention.

In the second embodiment, when the blur correction final adjustment region is not set (NO to the step S704), the blur correction processing of step S708 is performed using the blur correction cut-out region calculated in the step S703; however, the blur correction processing may not be preformed.

When the search condition includes the object search in which the existence of a specific object is searched, the detection position of the object may be designated as the blur correction final adjustment region. The CPU 101 functions as an object detection unit, and a program makes the CPU 101 realize the object detection function.

FIG. 8 is a flowchart showing the procedure of a search reproduction (variable power speed reproduction) processing executed by the image reproducing apparatus according to the second embodiment of the present invention.

In the processing of FIG. 8, the search reproduction means high-speed reproduction (fast-forward) such as double speed, four times speed, and eight times speed.

The processing of FIG. 8 is executed by the CPU 101 developing a program recorded in the ROM 103 in the RAM 102.

The processing of FIG. 8 is performed on the assumption that the moving image data search is performed before the reproduction of a moving image data, and the motion vector calculating position is set to the face detection position in the step S604 of FIG. 6. When the reproduction of the moving image data of the selected desired representative image (hereinafter referred to as "the selected moving image data" is instructed by the user operation based on the search result screen illustrated in FIG. 5C, the processing of FIG. 8 is started.

In FIG. 8, when the search reproduction is instructed by the user operation, the decoder 109 applies search reproduction of decoding processing to a frame image with a desired reproduction speed detected from the selected moving image (step S801).

Then, it is determined whether or not the blur correction final adjustment region is set (step S802). When the blur correction final adjustment region is set, the face detection unit 108 detects the face region in a search reproduced image obtained in the step S801 (step S803).

In the subsequent step S804, the blur correction cut-out such that the face region detected in the step S803 is positioned at the center of an image, and then the blur correction unit 105 performs the cut-out processing based on the blur correction cut-out region determined in the step S804 to allow the display output unit 104 to display a cut-out processing result (step S805). In this embodiment, an image subjected to the cut-out processing is enlarged to be displayed on the entire screen of the display output unit 104. The CPU 101 may realize an output unit or the output function that outputs the cut-out result.

As a result of the determination in step S802, when the blur correction final adjustment region is not set, the display output unit 104 displays the entire reproduced image, subjected to the search reproduction in the step S801, in a normal manner (step S807).

Finally, when a user instructs to terminate the reproduction, or when all search reproduction is terminated (YES to step S806), the processing is terminated.

When the face condition is included in the moving image search condition as above, it is possible to obtain a search reproduced moving image with the face region positioned at the center of a displayed image during the search reproduction processing, which enables a desired scene to be searched while focusing on the subject to be noticed as the search condition.

Although the blur correction processing is not performed by the motion detection of the entire image during the search reproduction, the blur correction processing may be performed in response to the reproduction speed. Specifically, when the reproduction speed is higher than a threshold value, the blur correction processing may not be performed, whereas when the reproduction speed is lower than the threshold value, the blur correction processing may be performed.

The above describes that the processing of FIG. 8 is performed during the high speed reproduction; however, the processing may also be performed during the slow speed reproduction. In this case, the search reproduction of the step S801 is directed to the slow speed reproduction. When the processing of FIG. 8 is employed during the slow speed reproduction, even in the slow speed reproduction with less motion, the subject to be noticed as the search condition is enlarged, which enables to visually confirm details of the subject to be noticed, and particularly facilitates the visual confirmation of the motion of the subject to be noticed.

In the step S805, the cut-out image is enlarged to be displayed on the entire display output unit 104; however, the entire reproduced image obtained in the step S801 may be displayed to be reduced in size so as to be superimposed on the cut-out image. Alternatively, simultaneously with the display of the cut-out image, the entire reproduced image obtained in the step S801 may be displayed to be reduced in size in a region different from the region where the cut-out image is displayed (FIG. 9). While the entire reproduced image obtained in the step S801 is displayed by the display output unit 104, the image obtained by cutting out in the step S805 may be displayed in a relatively small size so as to be superimposed on the reproduced image. This enables both of the condition of entire frame image at the current reproduction position and the then condition of the subject as the search condition to be simultaneously confirmed with high visibility.

FIG. 9 is a view showing an example in which an image cut out in step S805 of FIG. 8 is enlarged, and the entire reproduced image obtained in step S801 is reduced in size so as to be superimposed on the cut-out enlarged image.

In FIG. 9, an image 901 is directed to an image obtained based on the cut-out region by the search condition in the step S805. An image 902 is directed to a reduced image of the decoded image obtained in the step S801 (the entire reproduced image). As shown in FIG. 9, the image 901 to which a user pays attention and the image 902 as the entire image are composed, and then the composite image is displayed on the same screen, thereby enabling the user to simultaneously confirm the attention region and the entire image, which enables a desired scene to be more easily found.

In the above example, the blur correction final adjustment region is set to the face detection position in the step S604, and the setting to no blur correction final adjustment region is performed in the step S605; however, in this example, the setting of the blur correction final adjustment region may not be performed. Alternatively, the determination result in the step S603, the used search condition, or the current display mode that can specify the used search condition may be simply recorded in the RAM 102.

When it can be determined, based on the information recorded in the RAM 102, that a moving image found by the face search or the search associated with a face is instructed to be reproduced, the blur correction reproduction is performed in accordance with the processing of FIG. 7 in the usual reproduction. This allows the blur correction reproduction to be performed such that a face used in the search condition does not project from the display range due to the blur correction. In the search reproduction of similar moving images, the search reproduction is performed in accordance with the processing of FIG. 8.

On the other hand, when the reproduction of a moving image is instructed, and it can be determined, based on the information recorded in the RAM 102, that a moving image which is not a moving image found by the face search or the search associated with a face is instructed to be reproduced, in the usual reproduction, the blur correction reproduction is performed without specific consideration of the face used in the search condition as is distinct from the processing of FIG. 7, whereas in the search reproduction of similar moving images, the search reproduction different is performed without specific consideration of the face used in the search condition as is distinct from the processing of FIG. 8.

In the above embodiments, although the example of the face search or the search using the search condition associate with a face has been described, the present invention is not limited to this example. The present application can be also applied when using another search condition as long as a subject to which a user may pay attention during reproduction can be estimated based on the search condition. For example, when the search condition designated is that a face of an animal such as a dog and a cat is included in an image, the following method may be adopted. Namely, the blur correction reproduction is performed so as to correct the subject blur of the animal used in the search condition (first embodiment). The blur correction reproduction is performed so as to prevent the animal used in the search condition from projecting from the display range (second embodiment). The search reproduction is performed with the animal used in the search condition enlarged (second embodiment).

The CPU 101 may be controlled by a single hardware in the above embodiments, or the processing is divided among a plurality of hardwares, whereby the overall operation of the apparatus may be controlled.

Although preferred embodiments of the present invention have been described, the present invention is not limited to the embodiments. The present invention includes various embodiments without departing from the scope of the present invention. Further, the above embodiments are just one examples of the present invention, and the above embodiments may be suitably combined.

The above embodiments can be applied to a moving image reproducing apparatus that can reproduce moving images. Specifically, the present invention can be applied to a personal computer and PDA, a cell phone unit and a portable image viewer, and an imaging device such as a digital photo frame, a music player, a game machine, an electronic book reader, and a digital camera.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Applications No. 2010-106881, filed May 7, 2010 and No. 2011-013593 filed Jan. 26, 2011, which are hereby incorporated by reference herein in its entirety.

What is claimed is:

1. A moving image reproducing apparatus, comprising:
    a designation unit configured to designate a search condition of moving image data;
    a search unit configured to search moving image data among a plurality of moving images based on the search condition designated by the designation unit;
    a motion vector calculating position-setting unit configured to set, if one or more areas of a frame of the moving image data are searched by the search unit based on the designated search condition and the designated search condition includes a face search, a motion vector calculating position to a face detection position within said frame of the moving image data, and set, if said frame of the moving image data is searched by the search unit based on the designated search condition and the designated search condition does not include a face search, the motion vector calculating position to a neutral position within said frame of the moving image data, said neutral position being independent of any search condition and being the same for each frame in said moving image data;
    a motion vector calculation unit configured to calculate a motion vector of the moving image data searched by the search unit, based on the motion vector calculating position;
    a blur correction unit configured to set a blur correction cut-out region of the moving image data searched by the search unit, based on the motion vector calculated by the motion vector calculating unit, and subjecting the searched moving image data to blur correction; and
    an output unit configured to output the moving image data subjected to the blur correction by the blur correction setting unit.

2. The moving image reproducing apparatus according to claim 1, wherein when the search condition is a face of a person, the motion vector calculating position-setting unit designates a position of a face of a person, detected from the moving image data searched by the search unit, as the motion vector calculating position.

3. The moving image reproducing apparatus according to claim 1, wherein when the search condition is designated as a face of a specific person, the motion vector calculating position-setting unit designates a position where the face of the specific person, detected from the moving image data searched by the search unit, is detected as the motion vector calculating position.

4. The moving image reproducing apparatus according to claim 1, wherein when the motion vector calculating position cannot be set based on the search condition, the motion vector calculating position-setting unit sets the motion vector calculating position so as to reduce a blur of the entire image.

5. The moving image reproducing apparatus according to claim 1, wherein when the motion vector calculating position cannot be set based on the search condition, the motion vector calculating position-setting unit causes the blur correction unit to terminate the blur correction and causes the output unit to terminate the output.

6. The moving image reproducing apparatus according to claim 1, wherein when the search condition is not designated by the designation unit, the motion vector calculating position-setting unit sets the motion vector calculating position so as to reduce a blur of the entire image.

7. A moving image reproducing apparatus as in claim 1, wherein said neutral position is set to image center coordinates in said frame.

8. A control method for a moving image reproducing apparatus, comprising:
    a designation step of designating a search condition of moving image data;
    a search step of searching moving image data among a plurality of moving images based on the search condition designated in the designation step;
    a motion vector calculating position-setting step of setting, if one or more areas of a frame of the moving image data are searched in the search step based on the designated search condition and the designated search condition includes a face search, a motion vector calculating position to a face detection position within said frame of the moving image data, and setting, if said frame of the moving image data is searched in the search step based on the designated search condition and the designated search condition does not include a face search, the motion vector calculating position to a neutral position within said frame of the moving image data, said neutral position being independent of any search condition and being the same for each frame in said moving image data;
    a motion vector calculation step of calculating a motion vector of the moving image data searched in the search step, based on the motion vector calculating position;
    a blur correction step of setting a blur correction cut-out region of the moving image data searched in the search step, based on the motion vector calculated in the motion vector calculating step, and subjecting the searched moving image data to blur correction; and
    an output step of outputting the moving image data subjected to the blur correction in the blur correction setting step.

9. A non-transitory computer-readable storage medium storing a program for causing a computer to implement a control method for a moving image reproducing apparatus, the control method comprising:
    a designation step of designating a search condition of moving image data;
    a search step of searching moving image data among a plurality of moving images based on the search condition designated in the designation step;
    a motion vector calculating position-setting step of setting, if one or more areas of a frame of the moving image data are searched in the search step based on the designated search condition and the designated search condition includes a face search, a motion vector calculating position to a face detection position within said frame of the moving image data, and setting, if said frame of the moving image data is searched in the search step based on the designated search condition and the-designated search condition does not include a face search, the motion vector calculating position to a neutral position within said frame of the moving image data, said neutral position being independent of any search condition and being the same for each frame in said moving image data;

a motion vector calculation step of calculating a motion vector of the moving image data searched in the search step, based on the motion vector calculating position;

a blur correction step of setting a cut-out region of the moving image data searched in the search step, based on the motion vector calculated in the motion vector calculating step and apply blur correction to the searched moving image data; and an output step of outputting the moving image data subjected to the blur correction in the blur correction setting step.

\* \* \* \* \*